(12) United States Patent
Swanson et al.

(10) Patent No.: US 12,541,460 B2
(45) Date of Patent: Feb. 3, 2026

(54) MEMORY TRANSACTION QUEUE BYPASS BASED ON CONFIGURABLE ADDRESS AND BANDWIDTH CONDITIONS

(71) Applicant: Intel Corporation, Santa Clara, CA (US)

(72) Inventors: Jeffrey C. Swanson, Sunnyvale, CA (US); Sreenivas Mandava, Los Altos, CA (US); Henk Neefs, Palo Alto, CA (US); Jing Ling, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 750 days.

(21) Appl. No.: 17/682,111

(22) Filed: Feb. 28, 2022

(65) Prior Publication Data

US 2022/0179797 A1 Jun. 9, 2022

(51) Int. Cl.
*G06F 12/0888* (2016.01)
*G06F 9/46* (2006.01)
*G06F 9/48* (2006.01)
*G06F 12/1018* (2016.01)
*G06F 13/16* (2006.01)

(52) U.S. Cl.
CPC .......... *G06F 12/0888* (2013.01); *G06F 9/467* (2013.01); *G06F 9/4881* (2013.01); *G06F 12/1018* (2013.01); *G06F 13/1631* (2013.01)

(58) Field of Classification Search
CPC .... G06F 12/0888; G06F 9/467; G06F 9/4881; G06F 12/1018; G06F 13/1631; G06F 13/1668; G06F 2212/1024; G06F 2212/502; G06F 12/0284; G06F 12/0292
See application file for complete search history.

(56) References Cited

U.S. PATENT DOCUMENTS

| | | | |
|---|---|---|---|
| 6,173,392 B1 * | 1/2001 | Shinozaki | G06F 9/383 711/213 |
| 7,073,005 B1 * | 7/2006 | Basu | H04L 47/10 710/240 |
| 2018/0188976 A1 * | 7/2018 | Koo | G06F 12/0215 |
| 2018/0276150 A1 * | 9/2018 | Eckert | G06F 13/1642 |
| 2020/0356486 A1 * | 11/2020 | Sharma | G06F 12/084 |
| 2021/0133100 A1 * | 5/2021 | Artieri | G06F 12/0607 |
| 2021/0358540 A1 * | 11/2021 | Brandl | G11C 11/40615 |

* cited by examiner

*Primary Examiner* — Arpan P. Savla
*Assistant Examiner* — Victor R Cedeno
(74) *Attorney, Agent, or Firm* — Essential Patents Group, LLP

(57) ABSTRACT

An embodiment of an apparatus may comprise one or more substrates, and a controller coupled to the one or more substrates, the controller including circuitry to control access to a memory, convert an address for a transaction for the memory from a first address in a first address space to a second address in a second address space, determine a bandwidth bypass condition for the transaction based on a bandwidth of memory transactions for the memory, and provide the second address for the transaction to a scheduler at a time based at least in part on the determined bandwidth bypass condition. Other embodiments are disclosed and claimed.

20 Claims, 7 Drawing Sheets

MEMORY TRANSACTION QUEUE BYPASS BASED ON CONFIGURABLE ADDRESS AND BANDWIDTH CONDITIONS

BACKGROUND

A memory controller may store memory transaction requests in a transaction queue while the transactions wait to be acted on by a device scheduler. The memory controller may decode addresses for the memory transaction requests into device addresses. For example, a dynamic random access memory (DRAM) address may include bits that indicate DRAM device information (e.g., a chip identification), rank information, bank information, row information, and column information.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
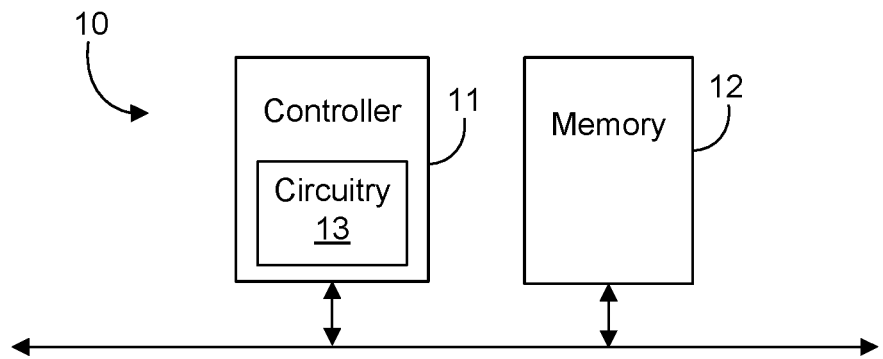
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, Field Programmable Gate Array (FPGA), firmware, driver, software, or any combination thereof. The material disclosed herein may also be implemented as instructions stored on a machine-readable medium, which may be read and executed by Moore Machine, Mealy Machine, and/or one or more processors. A machine-readable medium may include any medium and/or mechanism for storing or transmitting information in a form readable by a machine (e.g., a computing device). For example, a machine-readable medium may include read only memory (ROM); random access memory (RAM); Dynamic random-access memory (DRAM), magnetic disk storage media; optical storage media; NV memory devices; phase-change memory, qubit solid-state quantum memory, electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory component may include a three dimensional (3D) crosspoint memory device, or other byte addressable write-in-place nonvolatile memory devices. In one embodiment, the memory device may be or may include memory devices that use chalcogenide glass, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, or other suitable standard (the JEDEC standards cited herein are available at jedec.org).

With reference to FIG. 1, an embodiment of an electronic system 10 may include a controller 11 communicatively coupled to memory 12. The controller 11 may include circuitry 13 to convert an address for a transaction for the memory 12 from a first address in a first address space to a second address in a second address space, determine a conflict bypass condition for the transaction based on a dynamically configurable conflict check for the second address, and provide the second address for the transaction to a scheduler at a time based at least in part on the determined conflict bypass condition. For example, the circuitry 13 may be configured to dynamically configure a number of bits utilized to perform a conflict check for the second address.

In some embodiments, the circuitry 13 may be further configured to perform a partial lookup of entries in a transaction queue against a configurable subset of the second address, determine the conflict bypass condition as a partial conflict hit or a partial conflict miss based on the performed lookup, and provide the second address for the transaction to the scheduler immediately if the determined conflict bypass condition corresponds to a partial conflict miss. For example, the circuitry 13 may be configured to generate a hash of the second address for the configurable subset of the second address. In some embodiments, the circuitry 13 may also be configured to determine a late cancel condition for the transaction based on a full lookup of entries in the transaction queue for the second address, and provide an indication of the determined late cancel condition for the transaction to the scheduler.

In some embodiments, the circuitry 13 may be further configured to determine a bandwidth bypass condition for the transaction based on a bandwidth of memory transactions for the memory, and provide the second address for the transaction to the scheduler at a time based at least in part on the determined conflict bypass condition and the determined bandwidth bypass condition. For example, the circuitry 13 may be configured to monitor the bandwidth of memory transactions for the memory, and determine the bandwidth bypass condition based on whether the monitored bandwidth is less than a dynamically configurable bandwidth threshold.

Embodiments of the controller 11 may include a general purpose controller, a special purpose controller, a memory controller, a storage controller, a micro-controller, an execution unit, etc. In some embodiments, the memory 12, the circuitry 13, and/or other system memory may be located in, or co-located with, various components, including the controller 11 (e.g., on a same die or package substrate). For example, the controller 11 may be configured as a memory controller and the memory 12 may be system memory (e.g., DRAM, SRAM, etc.) or a connected memory device such as a dual-inline memory module (DIMM), a non-volatile DIMM (NVDIMM), a solid-state drive (SSD), a storage node, etc. Embodiments of each of the above controller 11, memory 12, circuitry 13, and other system components may be implemented in hardware, software, or any suitable combination thereof. For example, hardware implementations may include configurable logic, fixed-functionality logic, or any combination thereof. Examples of configurable logic include suitably configured programmable logic arrays (PLAs), FPGAs, complex programmable logic devices (CPLDs), and general purpose microprocessors. Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

Alternatively, or additionally, all or portions of these components may be implemented in one or more modules as a set of logic instructions stored in a machine- or computer-readable storage medium such as RAM, ROM, programmable ROM (PROM), firmware, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages. For example, the memory 12, other persistent storage media, or other system memory may store a set of instructions (e.g., which may be firmware instructions) which when executed by the controller 11 cause the system 10 to implement one or more components, features, or aspects of the system 10 (e.g., controlling access to the memory 12, converting addresses from the first address space to the second address space, determining the conflict bypass condition, determining the bandwidth bypass condition, bypassing the transaction queue based on the bypass conditions, etc.).

Figure 2A:
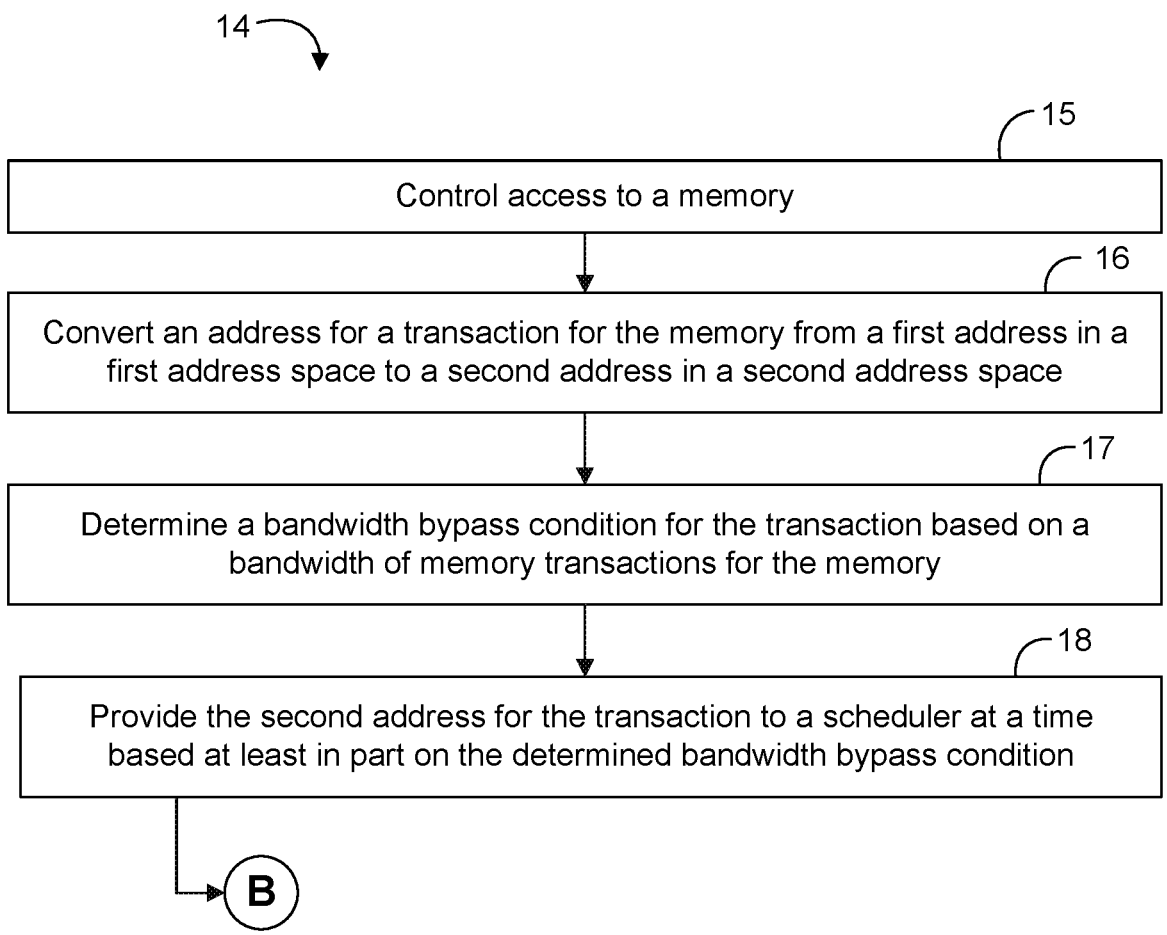
FIGS. 2A to 2B is a flowchart of an example of a method according to an embodiment.
Figure 2B:
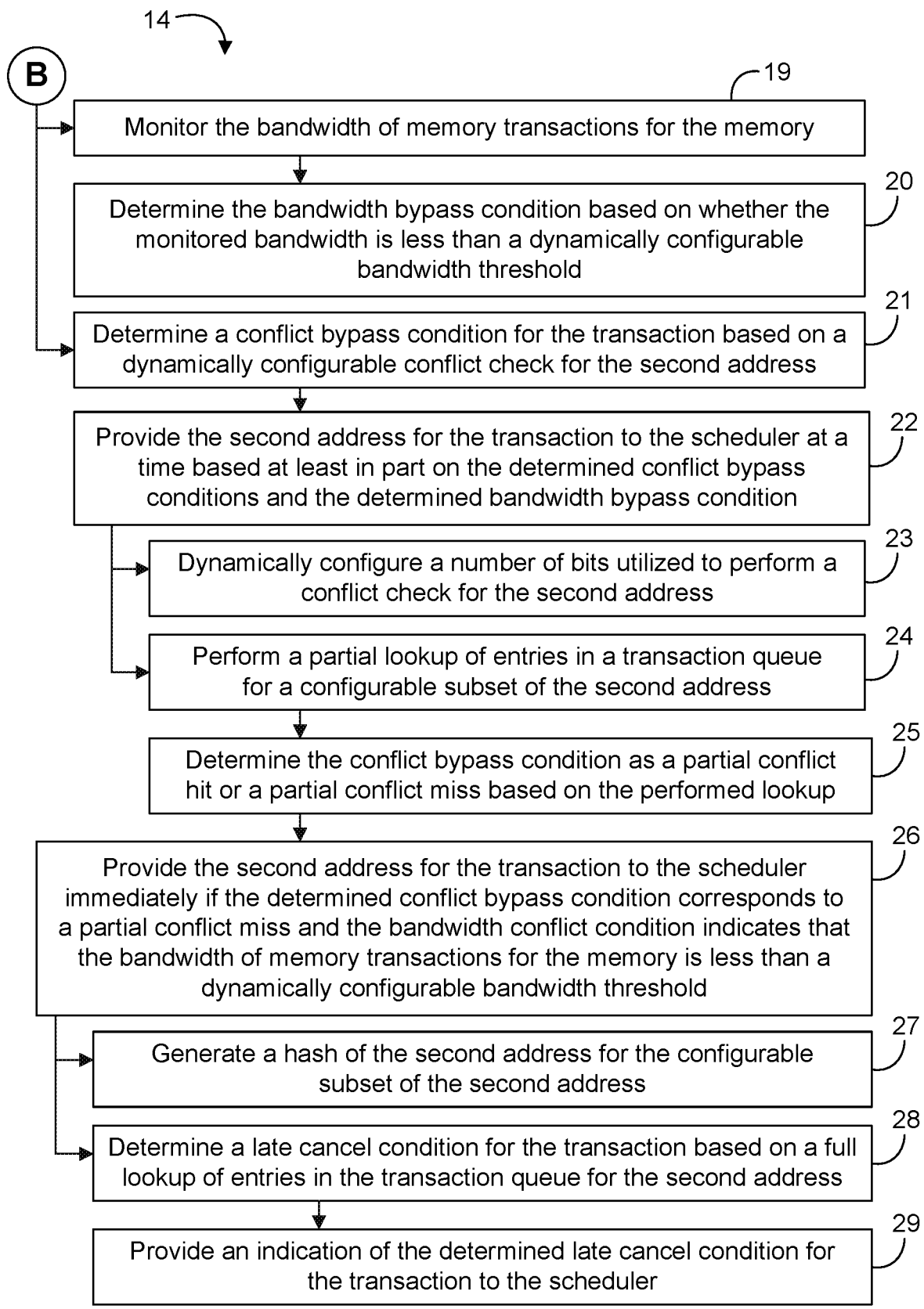

Turning now to FIGS. 2A to 2B, an embodiment of a method 14 may include controlling access to a memory at block 15, converting an address for a transaction for the memory from a first address in a first address space to a second address in a second address space at block 16, determining a bandwidth bypass condition for the transaction based on a bandwidth of memory transactions for the memory at block 17, and providing the second address for the transaction to a scheduler at a time based at least in part on the determined bandwidth bypass condition at block 18. For example, the method 14 may include monitoring the bandwidth of memory transactions for the memory at block 19, and determining the bandwidth bypass condition based on whether the monitored bandwidth is less than a dynamically configurable bandwidth threshold at block 20.

In some embodiments, the method 14 may further include determining a conflict bypass condition for the transaction based on a dynamically configurable conflict check for the second address at block 21, and providing the second address for the transaction to the scheduler at a time based at least in part on the determined conflict bypass conditions and the determined bandwidth bypass condition at block 22. For example, the method 14 may include dynamically configuring a number of bits utilized to perform a conflict check for the second address at block 23.

In some embodiments, the method 14 may further include performing a partial lookup of entries in a transaction queue for a configurable subset of the second address at block 24, determining the conflict bypass condition as a partial conflict hit or a partial conflict miss based on the performed lookup at block 25, and providing the second address for the transaction to the scheduler immediately if the determined conflict bypass condition corresponds to a partial conflict miss and the bandwidth conflict condition indicates that the bandwidth of memory transactions for the memory is less than a dynamically configurable bandwidth threshold at block 26. For example, the method 14 may include generating a hash of the second address for the configurable subset of the second address at block 27. Some embodiments of the method 14 may also include determining a late cancel condition for the transaction based on a full lookup of entries in the transaction queue for the second address at block 28, and providing an indication of the determined late cancel condition for the transaction to the scheduler at block 29.

Embodiments of the method 14 may be implemented in a system, apparatus, computer, device, etc., for example, such as those described herein. More particularly, hardware implementations may include configurable logic (e.g., suitably configured PLAs, FPGAs, CPLDs, general purpose microprocessors, etc.), fixed-functionality logic (e.g., suitably configured ASICs, combinational logic circuits, sequential logic circuits, etc.), or any combination thereof. Hybrid hardware implementations include static dynamic System-on-Chip (SoC) re-configurable devices such that control flow, and data paths implement logic for the functionality. Alternatively, or additionally, the method 14 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the method 14 may be implemented on a computer readable medium. Embodiments or portions of the method 14 may be implemented in firmware, applications (e.g., through an application programming interface (API)), or driver software running on an OS. Additionally, logic instructions might include assembler instructions, instruction set architecture (ISA) instructions, data set architecture (DSA) commands, (machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, Moore Machine, Mealy Machine, etc.).

Figure 3:
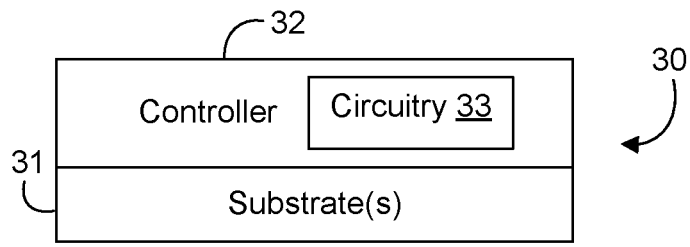
FIG. 3 is a block diagram of an example of an electronic apparatus according to an embodiment.

With reference to FIG. 3, an embodiment of an electronic apparatus 30 may include one or more substrates 31 and a controller 32 coupled to the one or more substrates 31. The controller 32 may include circuitry 33 to control access to a memory, convert an address for a transaction for the memory from a first address in a first address space to a second address in a second address space, determine a bandwidth bypass condition for the transaction based on a bandwidth of memory transactions for the memory, and provide the second address for the transaction to a scheduler at a time based at least in part on the determined bandwidth bypass condition. For example, the circuitry 33 may be configured to monitor the bandwidth of memory transactions for the memory, and determine the bandwidth bypass condition based on whether the monitored bandwidth is less than a dynamically configurable bandwidth threshold.

In some embodiments, the circuitry 33 may be further configured to determine a conflict bypass condition for the transaction based on a dynamically configurable conflict check for the second address, and provide the second address for the transaction to the scheduler at a time based at least in part on the determined conflict bypass conditions and the determined bandwidth bypass condition. For example, the circuitry 33 may be configured to dynamically configure a number of bits utilized to perform a conflict check for the second address.

In some embodiments, the circuitry 33 may be further configured to perform a partial lookup of entries in a transaction queue for a configurable subset of the second address, determine the conflict bypass condition as a partial conflict hit or a partial conflict miss based on the performed lookup, and provide the second address for the transaction to the scheduler immediately if the determined conflict bypass condition corresponds to a partial conflict miss and the bandwidth conflict condition indicates that the bandwidth of memory transactions for the memory is less than a dynamically configurable bandwidth threshold. For example, the circuitry 33 may be configured to generate a hash of the second address for the configurable subset of the second address. In some embodiments, the circuitry 33 may also be configured to determine a late cancel condition for the transaction based on a full lookup of entries in the transaction queue for the second address, and provide an indication of the determined late cancel condition for the transaction to the scheduler.

For example, the controller 32 may be configured as a memory controller. For example, the memory may be system memory (e.g., SRAM, DRAM, etc.) or a connected memory device (e.g., a DIMM, a NVDIMM, a SSD, a storage node, etc.). Embodiments of the circuitry 33 may be implemented in a system, apparatus, computer, device, etc., for example, such as those described herein. More particularly, hardware implementations may include configurable logic (e.g., suitably configured PLAs, FPGAs, CPLDs, general purpose microprocessors, etc.), fixed-functionality logic (e.g., suitably configured ASICs, combinational logic circuits, sequential logic circuits, etc.), or any combination thereof. Alternatively, or additionally, the circuitry 33 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the circuitry 33 may be implemented on a semiconductor apparatus, which may include the one or more substrates 31, with the circuitry 33 coupled to the one or more substrates 31. In some embodiments, the circuitry 33 may be at least partly implemented in one or more of configurable logic and fixed-functionality hardware logic on semiconductor substrate(s) (e.g., silicon, sapphire, gallium-arsenide, etc.). For example, the circuitry 33 may include a transistor array and/or other integrated circuit components coupled to the substrate(s) 31 with transistor channel regions that are positioned within the substrate(s) 31. The interface between the circuitry 33 and the substrate(s) 31 may not be an abrupt junction. The circuitry 33 may also be considered to include an epitaxial layer that is grown on an initial wafer of the substrate(s) 31.

Figure 4A:
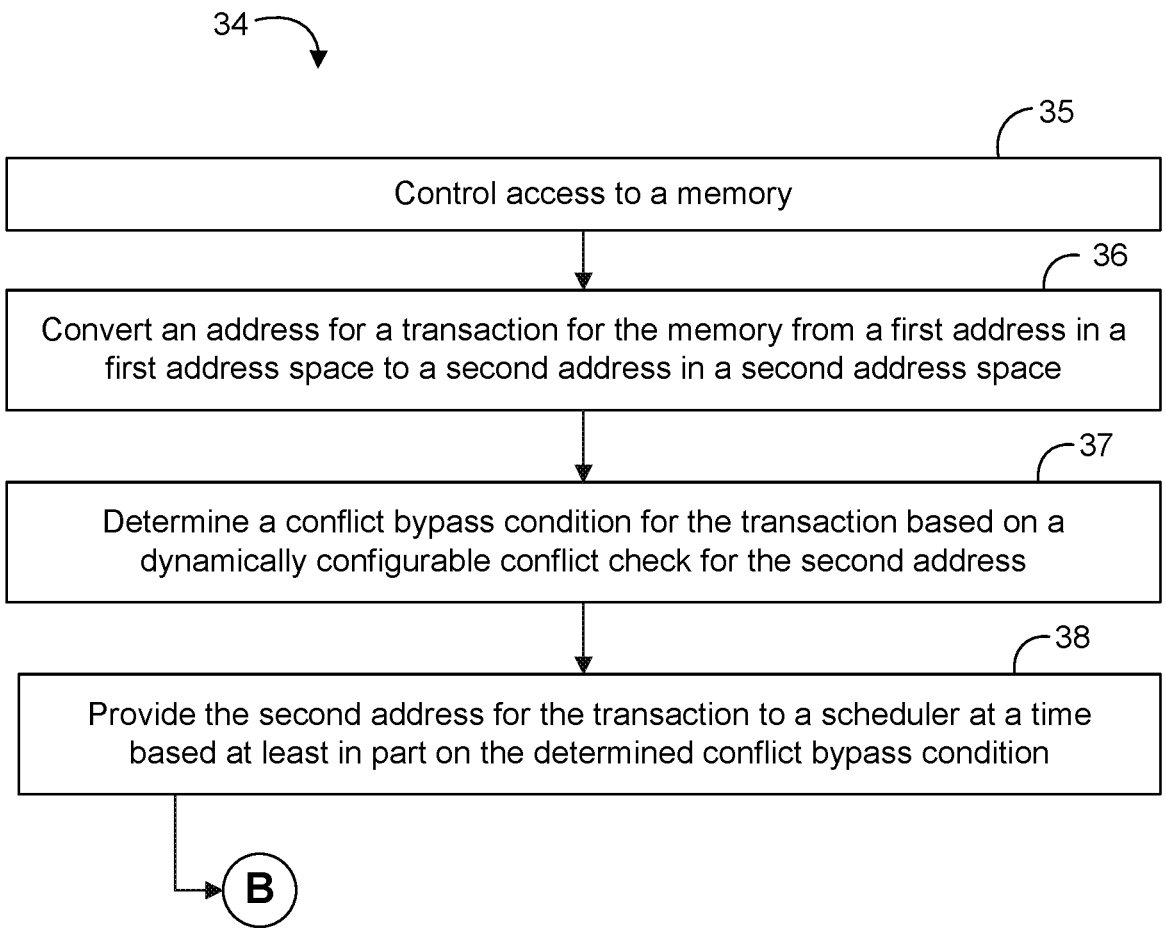
FIGS. 4A to 4B is a flowchart of another example of a method according to an embodiment.
Figure 4B:
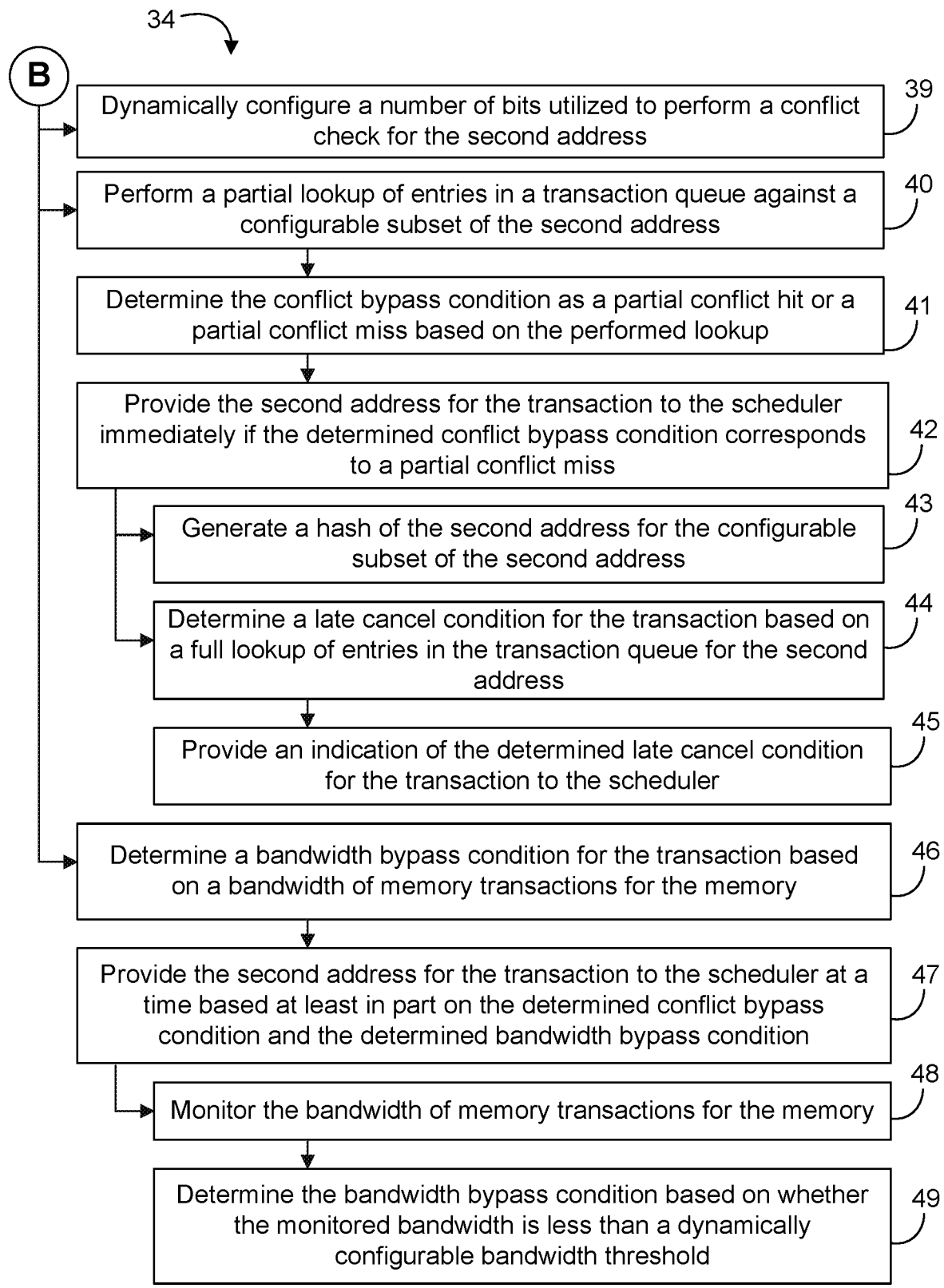

Turning now to FIGS. 4A to 4B, an embodiment of a method 34 may include controlling access to a memory at block 35, converting an address for a transaction for the memory from a first address in a first address space to a second address in a second address space at block 36, determining a conflict bypass condition for the transaction based on a dynamically configurable conflict check for the second address at block 37, and providing the second address for the transaction to a scheduler at a time based at least in part on the determined conflict bypass condition at block 38. For example, the method 34 may include dynamically configuring a number of bits utilized to perform a conflict check for the second address at block 39.

In some embodiments, the method 34 may further include performing a partial lookup of entries in a transaction queue against a configurable subset of the second address at block 40, determining the conflict bypass condition as a partial conflict hit or a partial conflict miss based on the performed lookup at block 41, and providing the second address for the transaction to the scheduler immediately if the determined conflict bypass condition corresponds to a partial conflict miss at block 42. For example, the method 34 may include generating a hash of the second address for the configurable subset of the second address at block 43. Some embodiments of the method 34 may also include determining a late cancel condition for the transaction based on a full lookup of entries in the transaction queue for the second address at block 44, and providing an indication of the determined late cancel condition for the transaction to the scheduler at block 45.

In some embodiments, the method 34 may further include determining a bandwidth bypass condition for the transaction based on a bandwidth of memory transactions for the memory at block 46, and providing the second address for the transaction to the scheduler at a time based at least in part on the determined conflict bypass condition and the determined bandwidth bypass condition at block 47. For example, the method 34 may include monitoring the bandwidth of memory transactions for the memory at block 48, and determining the bandwidth bypass condition based on whether the monitored bandwidth is less than a dynamically configurable bandwidth threshold at block 49.

Embodiments of the method 34 may be implemented in a system, apparatus, computer, device, etc., for example, such as those described herein. More particularly, hardware implementations may include configurable logic (e.g., suitably configured PLAs, FPGAs, CPLDs, general purpose microprocessors, etc.), fixed-functionality logic (e.g., suitably configured ASICs, combinational logic circuits, sequential logic circuits, etc.), or any combination thereof. Hybrid hardware implementations include static dynamic System-on-Chip (SoC) re-configurable devices such that control flow, and data paths implement logic for the functionality. Alternatively, or additionally, the method 34 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the method 34 may be implemented on a computer readable medium. Embodiments or portions of the method 34 may be implemented in firmware, applications (e.g., through an application programming interface (API)), or driver software running on an OS. Additionally, logic instructions might include assembler instructions, instruction set architecture (ISA) instructions, data set architecture (DSA) commands, (machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, Moore Machine, Mealy Machine, etc.).

Some embodiments may advantageously provide technology for memory decode bypass latency reductions in a memory controller. Memory latency is an important metric that directly impacts the performance of most workloads. Memory controllers may be designed to detect various conditions to determine if requests to memory can bypass portions of the pipeline. Bypassing pipeline stages with functionality that is not needed for a request may help in overall reduction of latency. Some memory controllers may implement an address conflict where the checked DRAM address attributes are fixed. A problem is that the number of address bits used for DRAM address conflict checking affects the number of cycles needed to complete the check. A memory controller that implements a conflict check in hardware with fixed addresses does not have the flexibility, based on workloads, to dynamically tradeoff between the preciseness of the conflict check and the cycles needed to complete the address check.

Also, some memory controllers may check the feasibility to bypass a transaction with hardware that is agnostic to the operating bandwidth. Accordingly, a new request may be bypassed to a scheduler under all bandwidth conditions including when the memory controller is operating at high bandwidth. A problem is that ignoring bandwidth conditions to bypass a request to a memory scheduler may help the latency of the bypassed request but may hurt the overall average memory latency and bandwidth. Some embodiments may provide technology to overcome one or more of the foregoing problems.

Some embodiments provide technology to reduce memory latency by implementing bypass conditions based on DRAM address conflict checking that is configurable in the attributes of DRAM addresses checked and the bandwidth conditions when the bypass can be exercised. Advantageously, some embodiments provide reduction of idle and loaded latency while reducing or minimizing bandwidth impact.

In some embodiments, memory decode circuitry converts an incoming transaction's physical address (e.g., a first address space) into a DRAM address (e.g., a second address space). The transaction is then scheduled to DRAM and is stored in a transaction queue (e.g., that may be out-of-order), until the transaction can be issued to a DRAM scheduler.

Some embodiments provide a combination of techniques to reduce the latency needed to determine eligibility for a transaction to issue as soon as the DRAM address is available without a store-and-forward operation from the transaction queue. In particular, some embodiments provide technology to: 1) perform a content-address memory (CAM) lookup of entries in the transaction queue based on either the full DRAM address or a configurable subset or hash of DRAM address bits/fields (e.g. DIMM, Rank, Sub-rank, Bank, Row and/or Column address) and if the lookup does not result in a CAM hit, the transaction may be sent immediately to the scheduler; 2) speculatively bypass the transaction to the scheduler without waiting for the CAM result, followed by a late cancel in the scheduler after the results of a CAM full conflict check are determined; and/or 3) monitor bus bandwidth to prioritize bypasses under low bandwidth cases, and disable bypasses under high bandwidth cases to give preference to previously queued transactions. In some embodiments, bypass selection may be implemented to improve or maximize DRAM bandwidth usage and/or to reduce or minimize overall latency (e.g., based on the limitation of hardware cost, implementable logical levels, etc.).

Hazard detection/prevention and scheduler issue criteria generally takes several cycles to be enforced, and may impact performance indicators of a memory controller such as idle time and average latency. Some embodiments advantageously provide multiple techniques to reduce or minimize the latency necessary to detect hazards and apply scheduler issue criteria to reduce idle and average latencies, without impacting maximum bandwidth efficiency metrics. In some embodiments, the techniques described herein may be applied simultaneously to all incoming traffic and the conditions may be dynamically adjusted as the traffic rate fluctuates up or down.

In some implementations, various bypasses may be configurable via hardware control registers that are programmable in firmware or at a basic input/output system (BIOS) or unified extensible firmware interface (UEFI) level. For example, a BIOS may provide control to enable or disable various bypass features or to set threshold values for various bypass conditions. Some bypass features/conditions/modes may also allow software control of exact conditions for bypass and/or provide register definitions that can be set/specified by software. In some embodiments, the tuning of the bypasses including bandwidth thresholds to turn the bypass on/off are BIOS configurable and may be made workload specific. Advantageously, embodiments provide significant latency improvements when bypass is enabled over a wide range of bandwidth efficiencies. Above a threshold bandwidth efficiency (e.g., greater than about 90% bandwidth efficiency), the bypass path may be dynamically disabled in order to prioritize maximum bandwidth efficiency over latency.

Figure 5:
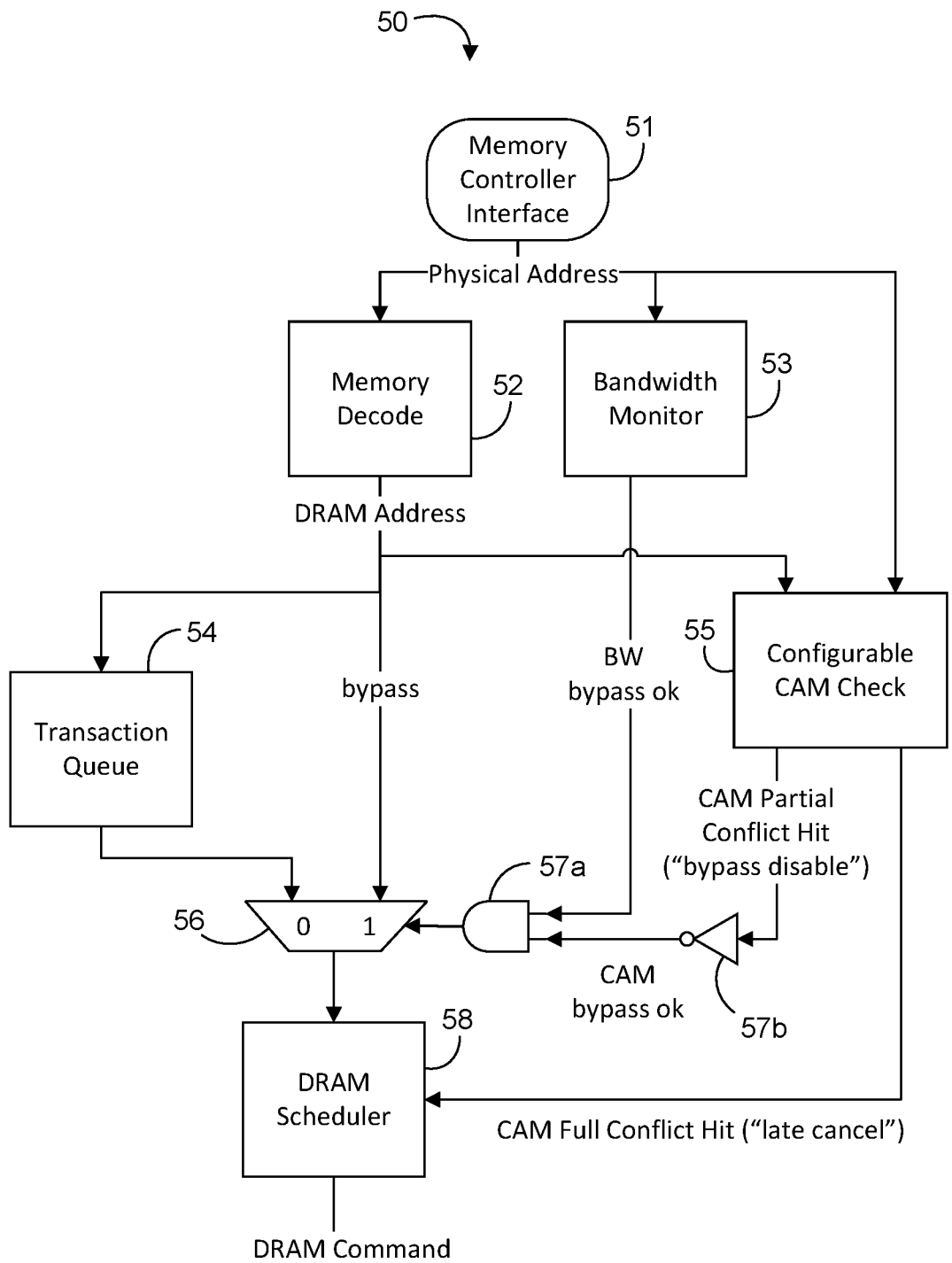
FIG. 5 is a block diagram of an example of a memory controller according to an embodiment.

With reference to FIG. 5, an embodiment of a memory controller 50 may include interface circuitry 51, memory decode circuitry 52, bandwidth monitor circuitry 53, a transaction queue 54, configurable CAM check circuitry 55, address selection circuitry 56, bypass logic circuitry 57a and 57b, and a DRAM scheduler 58, coupled as shown. The interface circuitry 51 may be configured to provide a suitable interface for the memory controller 50. The memory decode circuitry 52 may be configured to convert an incoming transaction's Physical Address into a DRAM address (e.g., rank, bank, etc.). The bandwidth monitor circuitry 53 may be configured to calculate a running average of the bandwidth (e.g., or to use a proxy/predictor of the traffic intensity such as, for example, transaction queue occupancies) to set thresholds to prioritize new incoming traffic versus previously queued transactions to send to the DRAM scheduler 58.

The configurable CAM check circuitry 55 may be configured to track the physical and/or DRAM address (e.g., or a subset of the address(es), or a hash of the address(es), or a hash of a subset of the address bits, etc.) of all outstanding transactions in the transaction queue 54 to detect hazard cases by performing a CAM operation on a configurable portion of the incoming address. The configurable CAM check circuitry 55 may be further configured to indicate when to bypass the transaction queue 54 and/or to notify late cancellations for transactions already issued to the DRAM scheduler 58. The transaction queue 54 may be configured to track all transactions from the time they arrive in the memory controller 50 until the read or write has completed. The transaction queue 54 may be out-of-order, for example to optimize performance, as long as the appropriate functional dependencies between reads and writes to the same memory location are respected to present functional correctness. The transaction queue 54 may be further configured to issue transactions which were not yet sent via the bypass path to the DRAM scheduler 58. The DRAM scheduler 58 may be configured to schedule and issue read/write requests to the DRAM.

Examples of Configurable DRAM Address Conflict Checking and Bypass for Latency Improvement In some embodiments, memory decode converts the physical address of an incoming request into a DRAM address that may include/indicate DIMM, Rank, Bank, Row, Column address information (e.g., and potentially even a channel indicator, a sub-rank, etc.). The address of each incoming request involves a CAM match to look for address conflicts with requests already pending in the transaction queue. The latency of each request in the scheduler is affected by the state of the DRAM page it targets and by complying with the various DRAM protocol turnaround and blocking rules from other scheduled DRAM transactions. While every request is always written to the transaction queue, simultaneously bypassing a request directly to the scheduler improves latency because lack of previous requests to the same DRAM location implies that there are fewer DRAM timing constraints that must be met to issue a request. In a bypass mode, a new request that does not have any older request already pending to the same DRAM Chip ID, Rank and Bank could be bypassed to the scheduler directly and can avoid the latency penalty seen if the transaction were to be issued from the transaction queue. The bypass mode may be used for Open Page mode and Closed Page mode. Additionally, in Open Page mode an incoming request is checked to determine if the incoming request matches completely on the full DRAM address except the Column Address of an older transaction. If a match is found then the new request is bypassed to the scheduler and helps to promote DRAM page hits.

In some embodiments, because the CAM address check can take multiple cycles, the CAM check can be configurable as a tradeoff between the preciseness of the DRAM address conflict check and the cycles needed to determine the CAM result. For example, the memory controller may be configured to check only the Rank and Bank, but skip the Chip ID address check. Checking fewer DRAM attributes allows faster bypasses to the scheduler but increases the possibility that a new request will be prevented from issuing from the scheduler because it is behind an older request to the same DRAM bank. In some embodiments, BIOS can configure the memory controller to select the preciseness of the DRAM addresses to check in the CAM.

Examples of Late Cancel for Speculative Bypass

Some embodiments may be configured to do a partial CAM check for incoming results and bypass to the scheduler if the partial CAM check indicates that the bypass is allowed. Some embodiments enable the full CAM to be completed in the next cycle after the bypass. If the full CAM check indicates an address conflict, then a late cancel is issued to the scheduler to drop the bypassed request. The request will then be re-issued from the transaction queue.

Examples of Bandwidth Monitor for Dynamic Bypass Control

Requests that bypass the transaction queue may throttle the rate of commands that can issue out of the transaction queue. The transaction queue will be able to drain commands under low bandwidth conditions. Under high bandwidth conditions, a high rate of bypasses may block requests from the transaction queue and increases overall loaded memory latency. Some embodiments may utilize a bandwidth and/or occupancy monitor that determines the operating bandwidth region of the workload and the transaction queue occupancy to control the rate of bypasses. If average bandwidth measured in the bandwidth monitor is below a configurable threshold, for example, the incoming requests are allowed to take the bypass path (e.g., if also allowed by the CAM check). When the average bandwidth exceeds a second configurable threshold, the bypass path will be disabled in order to prioritize previously received transactions. The two bandwidth thresholds provide a dynamic method to ensure low latency for low average bandwidth, and more consistent average latency for high average bandwidth. The spacing between the two bandwidth thresholds provides hysteresis to avoid erratic switching between priorities for low latency versus average latency. For simplification of some implementations, some embodiments may forgo the hysteresis and only have a single bandwidth threshold. Additionally, in some embodiments, the transaction queue occupancy can have a configurable bypass threshold and a configurable reissue threshold to control the rate of bypass versus reissue traffic.

In some embodiments, the bandwidth monitor may be an actual bandwidth monitor (e.g., counting commands for a particular time-interval). Alternatively, in some embodiments, the bandwidth monitor may utilize a proxy or predictor of the bandwidth. For example, queue occupancies may be a suitable proxy to provide a rough bandwidth estimate (e.g., low vs mid vs high bandwidth). In another example, other observable information such as bank-level-parallelism and/or DRAM page hit rates may be inputs to a predictor function (e.g., implemented as a table and potentially with interpolation capabilities) to predict/estimate present (or near-future) bandwidth.

Figure 6:
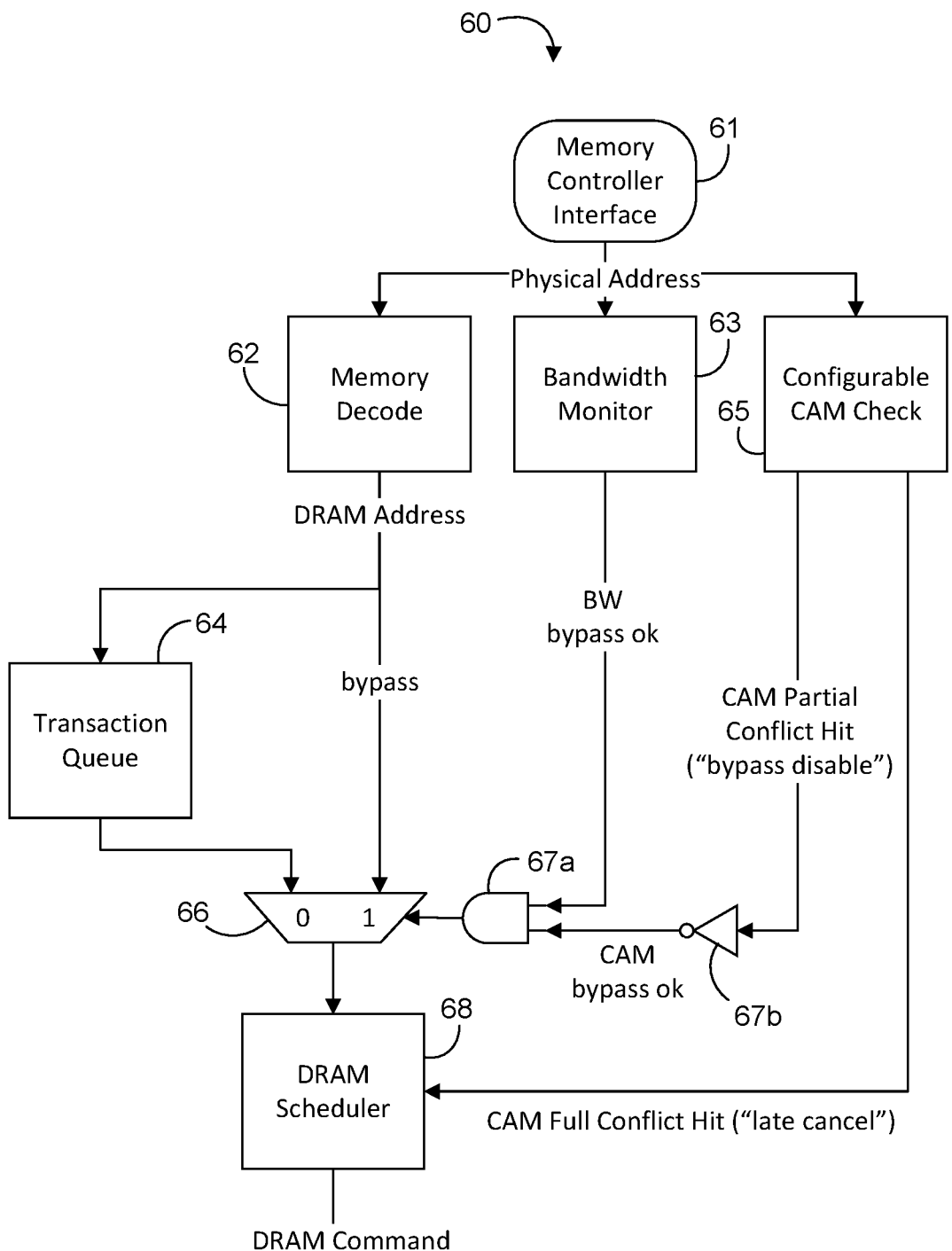
FIG. 6 is a block diagram of another example of a memory controller according to an embodiment.

With reference to FIG. 6, an embodiment of a memory controller 60 may provide reduced latency without memory decode information. The memory controller 60 may include interface circuitry 61, memory decode circuitry 62, bandwidth monitor circuitry 63, a transaction queue 64, configurable CAM check circuitry 65, address selection circuitry 66, bypass logic circuitry 67a and 67b, and a DRAM scheduler 68, coupled as shown. The various circuitry may be configured similarly as described above, except that for the CAM check circuitry 65 both the full and partial CAM checks are applied on the incoming physical address without waiting for the decoded DRAM address information. The CAM partial conflict check no longer has the granularity provided by the DRAM address fields (e.g., DIMM, Rank, Bank, Row and Column address), but provides a further reduction in latency (e.g., as compared to the memory controller 50). A full address match may provide less performance benefit but can share CAM logic utilized to ensure functionality for access hazards, in addition to being able to get earlier results. Partial matching to select bits close to address fields of the DRAM may be possible in some cases, but may require more complex algorithms to determine the bits in each configuration. When an address XOR is needed, a partial match may be performed on post-XOR addresses.

Examples of Optimizing Reads Versus Writes for Hardware Cost Reduction

In some usage scenarios, the read latency is more important for performance, while the write latency is generally less important for performance. In some embodiments, the bypass may be implemented only for reads to reduce hardware costs.

Additionally, some embodiments may split the transaction queue and associated CAM (e.g., or just the associated CAM) into a read-transactions queue and/or a reads-CAM and a write-transactions queue and/or a writes-CAM. A CAM operation on the writes-CAM may be needed for functional reasons to ensure correct read/write transaction ordering to avoid data corruption under hazard conditions (e.g., write-after-write or read-after-write). In a case of a reads bypass, the reads can reuse the functional logic to CAM on only the writes-CAM to determine if a bypass is taken, and potentially may utilize a smaller CAM. CAM matching for the reads-CAM is not required for functional reasons and may be skipped to help reduce hardware cost, power utilization, circuit area, and/or timing convergence of a physical implementation.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 7:
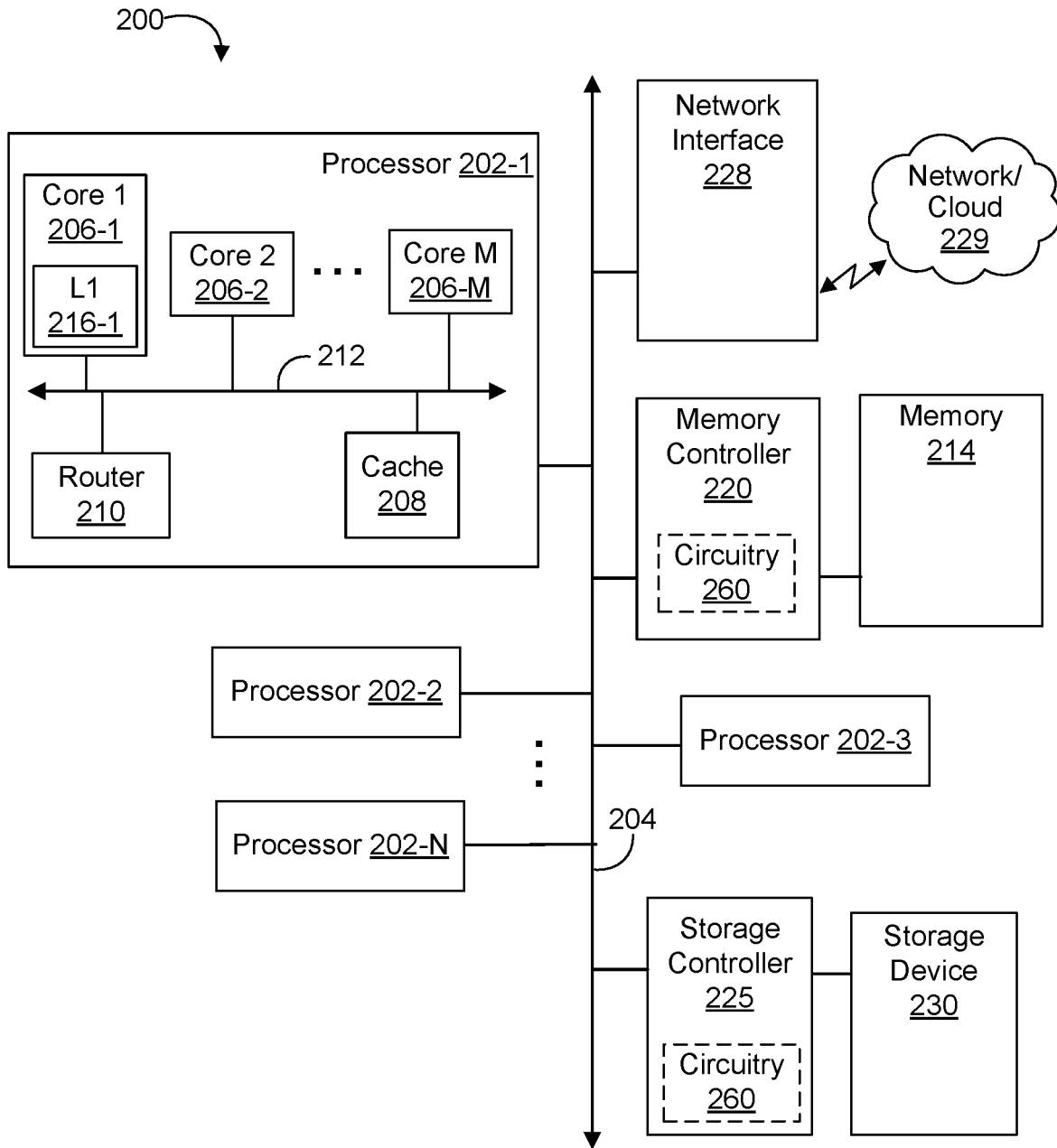
FIG. 7 is a block diagram of an example of a computing system according to an embodiment.

Turning now to FIG. 7, an embodiment of a computing system 200 may include one or more processors 202-1 through 202-N (generally referred to herein as "processors 202" or "processor 202"). The processors 202 may communicate via an interconnection or bus 204. Each processor 202 may include various components some of which are only discussed with reference to processor 202-1 for clarity. Accordingly, each of the remaining processors 202-2 through 202-N may include the same or similar components discussed with reference to the processor 202-1.

In some embodiments, the processor 202-1 may include one or more processor cores 206-1 through 206-M (referred to herein as "cores 206," or more generally as "core 206"), a cache 208 (which may be a shared cache or a private cache in various embodiments), and/or a router 210. The processor cores 206 may be implemented on a single integrated circuit (IC) chip. Moreover, the chip may include one or more shared and/or private caches (such as cache 208), buses or interconnections (such as a bus or interconnection 212), memory controllers, or other components.

In some embodiments, the router 210 may be used to communicate between various components of the processor 202-1 and/or system 200. Moreover, the processor 202-1 may include more than one router 210. Furthermore, the multitude of routers 210 may be in communication to enable data routing between various components inside or outside of the processor 202-1.

The cache 208 may store data (e.g., including instructions) that is utilized by one or more components of the processor 202-1, such as the cores 206. For example, the cache 208 may locally cache data stored in a memory 214 for faster access by the components of the processor 202. As shown in FIG. 7, the memory 214 may be in communication with the processors 202 via the interconnection 204. In some embodiments, the cache 208 (that may be shared) may have various levels, for example, the cache 208 may be a mid-level cache and/or a last-level cache (LLC). Also, each of the cores 206 may include a level 1 (L1) cache (216-1) (generally referred to herein as "L1 cache 216"). Various components of the processor 202-1 may communicate with the cache 208 directly, through a bus (e.g., the bus 212), and/or a memory controller or hub.

As shown in FIG. 7, memory 214 may be coupled to other components of system 200 through a memory controller 220. Memory 214 may include volatile memory and may be interchangeably referred to as main memory or system memory. Even though the memory controller 220 is shown to be coupled between the interconnection 204 and the memory 214, the memory controller 220 may be located elsewhere in system 200. For example, memory controller 220 or portions of it may be provided within one of the processors 202 in some embodiments. Alternatively, memory 214 may include byte-addressable non-volatile memory such as INTEL OPTANE technology.

The system 200 may communicate with other devices/systems/networks via a network interface 228 (e.g., which is in communication with a computer network and/or the cloud 229 via a wired or wireless interface). For example, the network interface 228 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 229.

System 200 may also include a storage device such as a storage device 230 coupled to the interconnect 204 via storage controller 225. Hence, storage controller 225 may control access by various components of system 200 to the storage device 230. Furthermore, even though storage controller 225 is shown to be directly coupled to the interconnection 204 in FIG. 7, storage controller 225 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), Serial Attached SCSI (SAS), Fiber Channel, CXL, etc.) with one or more other components of system 200 (for example where the storage bus is coupled to interconnect 204 via some other logic like a bus bridge, chipset, etc.) Additionally, storage controller 225 may be incorporated into memory controller logic or provided on a same integrated circuit (IC) device in various embodiments (e.g., on the same circuit board device as the storage device 230 or in the same enclosure as the storage device 230).

Furthermore, storage controller 225 and/or storage device 230 may be coupled to one or more sensors (not shown) to receive information (e.g., in the form of one or more bits or signals) to indicate the status of or values detected by the one or more sensors. These sensor(s) may be provided proximate to components of system 200 (or other computing systems discussed herein), including the cores 206, interconnections 204 or 212, components outside of the processor 202, storage device 230, SSD bus, SATA bus, storage controller 225, circuitry 260, etc., to sense variations in various factors affecting power/thermal behavior of the system/platform, such as temperature, operating frequency, operating voltage, power consumption, and/or inter-core communication activity, etc.

As shown in FIG. 7, features or aspects of the circuitry 260 may be distributed throughout the system 200, and/or co-located/integrated with various components of the system 200. Any aspect of the system 200 that may require or benefit from memory decode with configurable bypass technology may include the circuitry 260. For example, the memory 214, the memory controller 220 and the storage controller 225 may each include circuitry 260, which may be in the same enclosure as the system 200 and/or fully integrated on a printed circuit board (PCB) of the system 200. For example, the respective circuitry 260 may be configured to provide technology for the memory 214 and/or the storage device 230 to bypass a transaction queue based on configurable address conflict conditions and/or configurable bandwidth conditions.

Advantageously, the circuitry 260 may include technology to implement one or more aspects of the system 10 (FIG. 1), the apparatus 15 (FIG. 2), the method 14 (FIGS. 3A to 3B), the memory controller 40 (FIG. 4), the memory controller 50 (FIG. 5), the memory controller 60 (FIG. 6), and/or any of the configurable bypass features discussed herein. The system 200 may include further circuitry 260 and located outside of the foregoing components.

In some embodiments, the memory 214 may be DRAM. The circuitry 260 may be configured to convert an address for a transaction for the memory 214 from a first address in a first address space to a second address in a second address space, determine a conflict bypass condition for the transaction based on a dynamically configurable conflict check for one or more of the first address and the second address, and provide the second address for the transaction to a scheduler at a time based at least in part on the determined conflict bypass condition. For example, the circuitry 260 may be configured to dynamically configure respective numbers of bits utilized to perform a conflict check for the first address and/or the second address.

In some embodiments, the circuitry 260 may be further configured to perform a partial lookup of entries in a transaction queue against respective configurable subsets of the first address and/or the second address, determine the conflict bypass condition as a partial conflict hit or a partial conflict miss based on the performed lookup, and provide the second address for the transaction to the scheduler immediately if the determined conflict bypass condition corresponds to a partial conflict miss. For example, the circuitry 260 may be configured to generate respective hash numbers of the first address and/or second address for the respective configurable subsets of the first address and/or the second address. In some embodiments, the circuitry 260 may also be configured to determine a late cancel condition for the transaction based on a full lookup of entries in the transaction queue for the first address and/or the second address, and provide an indication of the determined late cancel condition for the transaction to the scheduler.

Additionally, or alternatively, the circuitry 260 may be further configured to determine a bandwidth bypass condition for the transaction based on a bandwidth of memory transactions for the memory (e.g., or a proxy for the bandwidth, such as a transaction queue occupancy), and provide the second address for the transaction to the scheduler at a time based at least in part on the determined bandwidth bypass condition (e.g., optionally together with the determined conflict bypass condition). For example, the circuitry 260 may be configured to monitor the bandwidth of memory transactions for the memory, and determine the bandwidth bypass condition based on whether the monitored bandwidth is less than a dynamically configurable bandwidth threshold.

Additional Notes and Examples

Example 1 includes an electronic apparatus, comprising one or more substrates, and a controller coupled to the one or more substrates, the controller including circuitry to control access to a memory, convert an address for a transaction for the memory from a first address in a first address space to a second address in a second address space, determine a band width bypass condition for the transaction based on a band width of memory transactions for the memory, and provide the second address for the transaction to a scheduler at a time based at least in part on the determined band width bypass condition.

Example 2 includes the apparatus of Example 1, wherein the circuitry is further to monitor the band width of memory transactions for the memory, and determine the band width bypass condition based on whether the monitored band width is less than a dynamically configurable band width threshold.

Example 3 includes the apparatus of any of Examples 1 to 2, wherein the circuitry is further to determine a conflict bypass condition for the transaction based on a dynamically configurable conflict check for the second address, and provide the second address for the transaction to the scheduler at a time based at least in part on the determined conflict bypass conditions and the determined band width bypass condition.

Example 4 includes the apparatus of Example 3, wherein the circuitry is further to dynamically configure a number of bits utilized to perform a conflict check for the second address.

Example 5 includes the apparatus of any of Examples 3 to 4, wherein the circuitry is further to perform a partial lookup of entries in a transaction queue for a configurable subset of the second address, determine the conflict bypass condition as a partial conflict hit or a partial conflict miss based on the performed lookup, and provide the second address for the transaction to the scheduler immediately if the determined conflict bypass condition corresponds to a partial conflict miss and the band width conflict condition indicates that the band width of memory transactions for the memory is less than a dynamically configurable band width threshold.

Example 6 includes the apparatus of Example 5, wherein the circuitry is further to generate a hash of the second address for the configurable subset of the second address.

Example 7 includes the apparatus of any of Examples 5 to 6, wherein the circuitry is further to determine a late cancel condition for the transaction based on a full lookup of entries in the transaction queue for the second address, and provide an indication of the determined late cancel condition for the transaction to the scheduler.

Example 8 includes an electronic system, comprising memory, and a controller communicatively coupled to the memory, the controller including circuitry to convert an address for a transaction for the memory from a first address in a first address space to a second address in a second address space, determine a conflict bypass condition for the transaction based on a dynamically configurable conflict check for the second address, and provide the second address for the transaction to a scheduler at a time based at least in part on the determined conflict bypass condition.

Example 9 includes the system of Example 8, wherein the circuitry is further to dynamically configure a number of bits utilized to perform a conflict check for the second address.

Example 10 includes the system of any of Examples 8 to 9, wherein the circuitry is further to perform a partial lookup of entries in a transaction queue against a configurable subset of the second address, determine the conflict bypass condition as a partial conflict hit or a partial conflict miss based on the performed lookup, and provide the second address for the transaction to the scheduler immediately if the determined conflict bypass condition corresponds to a partial conflict miss.

Example 11 includes the system of Example 10, wherein the circuitry is further to generate a hash of the second address for the configurable subset of the second address.

Example 12 includes the system of any of Examples 10 to 11, wherein the circuitry is further to determine a late cancel condition for the transaction based on a full lookup of entries in the transaction queue for the second address, and provide an indication of the determined late cancel condition for the transaction to the scheduler.

Example 13 includes the system of any of Examples 8 to 12, wherein the circuitry is further to determine a band width bypass condition for the transaction based on a band width of memory transactions for the memory, and provide the second address for the transaction to the scheduler at a time based at least in part on the determined conflict bypass condition and the determined band width bypass condition.

Example 14 includes the system of Example 13, wherein the circuitry is further to monitor the band width of memory transactions for the memory, and determine the band width bypass condition based on whether the monitored band width is less than a dynamically configurable band width threshold.

Example 15 includes a method, comprising controlling access to a memory, converting an address for a transaction for the memory from a first address in a first address space to a second address in a second address space, determining a band width bypass condition for the transaction based on a band width of memory transactions for the memory, and providing the second address for the transaction to a scheduler at a time based at least in part on the determined band width bypass condition.

Example 16 includes the method of Example 15, further comprising monitoring the band width of memory transactions for the memory, and determining the band width bypass condition based on whether the monitored band width is less than a dynamically configurable band width threshold.

Example 17 includes the method of any of Examples 15 to 16, further comprising determining a conflict bypass condition for the transaction based on a dynamically configurable conflict check for the second address, and providing the second address for the transaction to the scheduler at a time based at least in part on the determined conflict bypass conditions and the determined band width bypass condition.

Example 18 includes the method of Example 17, further comprising dynamically configuring a number of bits utilized to perform a conflict check for the second address.

Example 19 includes the method of any of Examples 17 to 18, further comprising performing a partial lookup of entries in a transaction queue for a configurable subset of the second address, determining the conflict bypass condition as a partial conflict hit or a partial conflict miss based on the performed lookup, and providing the second address for the transaction to the scheduler immediately if the determined conflict bypass condition corresponds to a partial conflict miss and the band width conflict condition indicates that the band width of memory transactions for the memory is less than a dynamically configurable band width threshold.

Example 20 includes the method of Example 19, further comprising generating a hash of the second address for the configurable subset of the second address.

Example 21 includes the method of any of Examples 19 to 20, further comprising determining a late cancel condition for the transaction based on a full lookup of entries in the transaction queue for the second address, and providing an indication of the determined late cancel condition for the transaction to the scheduler.

Example 22 includes a method, comprising controlling access to a memory, converting an address for a transaction for the memory from a first address in a first address space to a second address in a second address space, determining a conflict bypass condition for the transaction based on a dynamically configurable conflict check for the second address, and providing the second address for the transaction to a scheduler at a time based at least in part on the determined conflict bypass condition.

Example 23 includes the method of Example 22, further comprising dynamically configuring a number of bits utilized to perform a conflict check for the second address.

Example 24 includes the method of any of Examples 22 to 23, further comprising performing a partial lookup of entries in a transaction queue against a configurable subset of the second address, determining the conflict bypass condition as a partial conflict hit or a partial conflict miss based on the performed lookup, and providing the second address for the transaction to the scheduler immediately if the determined conflict bypass condition corresponds to a partial conflict miss.

Example 25 includes the method of Example 24, further comprising generating a hash of the second address for the configurable subset of the second address.

Example 26 includes the method of any of Examples 24 to 25, further comprising determining a late cancel condition for the transaction based on a full lookup of entries in the transaction queue for the second address, and providing an indication of the determined late cancel condition for the transaction to the scheduler.

Example 27 includes the method of any of Examples 22 to 26, further comprising determining a band width bypass condition for the transaction based on a transaction queue occupancy for the memory, and providing the second address for the transaction to the scheduler at a time based at least in part on the determined conflict bypass condition and the determined band width bypass condition.

Example 28 includes the method of any of Examples 22 to 26, further comprising determining a band width bypass condition for the transaction based on a band width of memory transactions for the memory, and providing the second address for the transaction to the scheduler at a time based at least in part on the determined conflict bypass condition and the determined band width bypass condition.

Example 29 includes the method of Example 28, further comprising monitoring the band width of memory transactions for the memory, and determining the band width bypass condition based on whether the monitored band width is less than a dynamically configurable band width threshold.

Example 30 includes a method, comprising controlling access to a memory, converting an address for a transaction for the memory from a first address in a first address space to a second address in a second address space, determining a band width bypass condition for the transaction based on a transaction queue occupancy for the memory, and providing the second address for the transaction to a scheduler at a time based at least in part on the determined band width bypass condition.

Example 31 includes a method, comprising controlling access to a memory, converting an address for a transaction for the memory from a first address in a first address space to a second address in a second address space, determining a conflict bypass condition for the transaction based on a dynamically configurable conflict check for the first address, and providing the second address for the transaction to a scheduler at a time based at least in part on the determined conflict bypass condition.

Example 32 includes at least one non-transitory one machine readable medium comprising a plurality of instructions that, in response to being executed on a computing device, cause the computing device to control access to a memory, convert an address for a transaction for the memory from a first address in a first address space to a second address in a second address space, determine a band width bypass condition for the transaction based on a band width of memory transactions for the memory, and provide the second address for the transaction to a scheduler at a time based at least in part on the determined band width bypass condition.

Example 33 includes the at least one non-transitory one machine readable medium of Example 32, comprising a plurality of further instructions that, in response to being executed on the computing device, cause the computing device to monitor the band width of memory transactions for the memory, and determine the band width bypass condition based on whether the monitored band width is less than a dynamically configurable band width threshold.

Example 34 includes the at least one non-transitory one machine readable medium of any of Examples 32 to 33, comprising a plurality of further instructions that, in response to being executed on the computing device, cause the computing device to determine a conflict bypass condition for the transaction based on a dynamically configurable conflict check for the second address, and provide the second address for the transaction to the scheduler at a time based at least in part on the determined conflict bypass conditions and the determined band width bypass condition.

Example 35 includes the at least one non-transitory one machine readable medium of Example 34, comprising a plurality of further instructions that, in response to being executed on the computing device, cause the computing device to dynamically configure a number of bits utilized to perform a conflict check for the second address.

Example 36 includes the at least one non-transitory one machine readable medium of any of Examples 34 to 35, comprising a plurality of further instructions that, in response to being executed on the computing device, cause the computing device to perform a partial lookup of entries in a transaction queue for a configurable subset of the second address, determine the conflict bypass condition as a partial conflict hit or a partial conflict miss based on the performed lookup, and provide the second address for the transaction to the scheduler immediately if the determined conflict bypass condition corresponds to a partial conflict miss and the band width conflict condition indicates that the band width of memory transactions for the memory is less than a dynamically configurable band width threshold.

Example 37 includes the at least one non-transitory one machine readable medium of Example 36, comprising a plurality of further instructions that, in response to being executed on the computing device, cause the computing device to generate a hash of the second address for the configurable subset of the second address.

Example 38 includes the at least one non-transitory one machine readable medium of any of Examples 36 to 37, comprising a plurality of further instructions that, in response to being executed on the computing device, cause the computing device to determine a late cancel condition for the transaction based on a full lookup of entries in the transaction queue for the second address, and provide an indication of the determined late cancel condition for the transaction to the scheduler.

Example 39 includes at least one non-transitory one machine readable medium comprising a plurality of instructions that, in response to being executed on a computing device, cause the computing device to control access to a memory, convert an address for a transaction for the memory from a first address in a first address space to a second address in a second address space, determine a conflict bypass condition for the transaction based on a dynamically configurable conflict check for the second address, and provide the second address for the transaction to a scheduler at a time based at least in part on the determined conflict bypass condition.

Example 40 includes the at least one non-transitory one machine readable medium of Example 39, comprising a plurality of further instructions that, in response to being executed on the computing device, cause the computing device to dynamically configure a number of bits utilized to perform a conflict check for the second address.

Example 41 includes the at least one non-transitory one machine readable medium of any of Examples 39 to 40, comprising a plurality of further instructions that, in response to being executed on the computing device, cause the computing device to perform a partial lookup of entries in a transaction queue against a configurable subset of the second address, determine the conflict bypass condition as a partial conflict hit or a partial conflict miss based on the performed lookup, and provide the second address for the transaction to the scheduler immediately if the determined conflict bypass condition corresponds to a partial conflict miss.

Example 42 includes the at least one non-transitory one machine readable medium of Example 41, comprising a plurality of further instructions that, in response to being executed on the computing device, cause the computing device to generate a hash of the second address for the configurable subset of the second address.

Example 43 includes the at least one non-transitory one machine readable medium of any of Examples 41 to 42, comprising a plurality of further instructions that, in response to being executed on the computing device, cause the computing device to determine a late cancel condition for the transaction based on a full lookup of entries in the transaction queue for the second address, and provide an indication of the determined late cancel condition for the transaction to the scheduler.

Example 44 includes the at least one non-transitory one machine readable medium of any of Examples 39 to 43, comprising a plurality of further instructions that, in response to being executed on the computing device, cause the computing device to determine a band width bypass condition for the transaction based on a transaction queue occupancy for the memory, and provide the second address for the transaction to the scheduler at a time based at least in part on the determined conflict bypass condition and the determined band width bypass condition.

45 includes the at least one non-transitory one machine readable medium of any of Examples 39 to 43, comprising a plurality of further instructions that, in response to being executed on the computing device, cause the computing device to determine a band width bypass condition for the transaction based on a band width of memory transactions for the memory, and provide the second address for the transaction to the scheduler at a time based at least in part on the determined conflict bypass condition and the determined band width bypass condition.

Example 46 includes the at least one non-transitory one machine readable medium of Example 45, comprising a plurality of further instructions that, in response to being executed on the computing device, cause the computing device to monitor the band width of memory transactions for the memory, and determine the band width bypass condition based on whether the monitored band width is less than a dynamically configurable band width threshold.

Example 47 includes at least one non-transitory one machine readable medium comprising a plurality of instructions that, in response to being executed on a computing device, cause the computing device to control access to a memory, convert an address for a transaction for the memory from a first address in a first address space to a second address in a second address space, determine a band width bypass condition for the transaction based on a transaction queue occupancy for the memory, and providing the second address for the transaction to a scheduler at a time based at least in part on the determined band width bypass condition.

Example 48 includes at least one non-transitory one machine readable medium comprising a plurality of instructions that, in response to being executed on a computing device, cause the computing device to control access to a memory, convert an address for a transaction for the memory from a first address in a first address space to a second address in a second address space, determine a conflict bypass condition for the transaction based on a dynamically configurable conflict check for the first address, and provide the second address for the transaction to a scheduler at a time based at least in part on the determined conflict bypass condition.

Example 49 includes an apparatus, comprising means for controlling access to a memory, means for converting an address for a transaction for the memory from a first address in a first address space to a second address in a second address space, means for determining a band width bypass condition for the transaction based on a band width of memory transactions for the memory, and means for providing the second address for the transaction to a scheduler at a time based at least in part on the determined band width bypass condition.

Example 50 includes the apparatus of Example 50, further comprising means for monitoring the band width of memory transactions for the memory, and means for determining the band width bypass condition based on whether the monitored band width is less than a dynamically configurable band width threshold.

Example 51 includes the apparatus of any of Examples 49 to 50, further comprising means for determining a conflict bypass condition for the transaction based on a dynamically configurable conflict check for the second address, and means for providing the second address for the transaction to the scheduler at a time based at least in part on the determined conflict bypass conditions and the determined band width bypass condition.

Example 52 includes the apparatus of Example 51, further comprising means for dynamically configuring a number of bits utilized to perform a conflict check for the second address.

Example 53 includes the apparatus of any of Examples 51 to 52, further comprising means for performing a partial lookup of entries in a transaction queue for a configurable subset of the second address, means for determining the conflict bypass condition as a partial conflict hit or a partial conflict miss based on the performed lookup, and means for providing the second address for the transaction to the scheduler immediately if the determined conflict bypass condition corresponds to a partial conflict miss and the band width conflict condition indicates that the band width of memory transactions for the memory is less than a dynamically configurable band width threshold.

Example 54 includes the apparatus of Example 53, further comprising means for generating a hash of the second address for the configurable subset of the second address.

Example 55 includes the apparatus of any of Examples 53 to 54, further comprising means for determining a late cancel condition for the transaction based on a full lookup of entries in the transaction queue for the second address, and means for providing an indication of the determined late cancel condition for the transaction to the scheduler.

Example 56 includes an apparatus, comprising means for controlling access to a memory, means for converting an address for a transaction for the memory from a first address in a first address space to a second address in a second address space, means for determining a conflict bypass condition for the transaction based on a dynamically configurable conflict check for the second address, and means for providing the second address for the transaction to a scheduler at a time based at least in part on the determined conflict bypass condition.

Example 57 includes the apparatus of Example 56, further comprising means for dynamically configuring a number of bits utilized to perform a conflict check for the second address.

Example 58 includes the apparatus of any of Examples 56 to 57, further comprising means for performing a partial lookup of entries in a transaction queue against a configurable subset of the second address, means for determining the conflict bypass condition as a partial conflict hit or a partial conflict miss based on the performed lookup, and means for providing the second address for the transaction to the scheduler immediately if the determined conflict bypass condition corresponds to a partial conflict miss.

Example 59 includes the apparatus of Example 58, further comprising means for generating a hash of the second address for the configurable subset of the second address.

Example 60 includes the apparatus of any of Examples 58 to 59, further comprising means for determining a late cancel condition for the transaction based on a full lookup of entries in the transaction queue for the second address, and means for providing an indication of the determined late cancel condition for the transaction to the scheduler.

Example 61 includes the apparatus of any of Examples 56 to 60, further comprising means for determining a band width bypass condition for the transaction based on a transaction queue occupancy for the memory, and means for providing the second address for the transaction to the scheduler at a time based at least in part on the determined conflict bypass condition and the determined band width bypass condition.

Example 62 includes the apparatus of any of Examples 56 to 60, further comprising means for determining a band width bypass condition for the transaction based on a band width of memory transactions for the memory, and means for providing the second address for the transaction to the scheduler at a time based at least in part on the determined conflict bypass condition and the determined band width bypass condition.

Example 63 includes the apparatus of Example 62, further comprising means for monitoring the band width of memory transactions for the memory, and means for determining the band width bypass condition based on whether the monitored band width is less than a dynamically configurable band width threshold.

Example 64 includes an apparatus, comprising means for controlling access to a memory, means for converting an address for a transaction for the memory from a first address in a first address space to a second address in a second address space, means for determining a band width bypass condition for the transaction based on a transaction queue occupancy for the memory, and means for providing the second address for the transaction to a scheduler at a time based at least in part on the determined band width bypass condition.

Example 65 includes an apparatus, comprising means for controlling access to a memory, means for converting an address for a transaction for the memory from a first address in a first address space to a second address in a second address space, means for determining a conflict bypass condition for the transaction based on a dynamically configurable conflict check for the first address, and means for providing the second address for the transaction to a scheduler at a time based at least in part on the determined conflict bypass condition.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
   one or more substrates; and
   a controller coupled to the one or more substrates, the controller comprising:
   a decoder circuit to receive a first address of a request to access a memory, wherein the first address is in a first address space, the decoder circuit further to convert first address into a second address in a second address space;
   a queue coupled to receive the second address from the decoder circuit; and
   a selector circuit coupled to the decoder circuit via a first path, wherein the first path bypasses the queue, the selector circuit further coupled to the queue via a second path, and further coupled to receive a control signal which is to be based on a first indication of a bandwidth of transactions which are each to access the memory, wherein, based on the control signal, the selector circuit is to select between:
   the first path to communicate the second address to a scheduler; and
   the second path to communicate an output of the queue to the scheduler.

2. The electronic apparatus of claim 1, wherein the controller further comprises:
   a monitor circuit coupled to the selector circuit, the monitor circuit to:
   perform an evaluation as to whether the bandwidth of the transactions is less than a dynamically configurable bandwidth threshold; and
   generate the first indication based on the evaluation.

3. The electronic apparatus of claim 1, wherein:
   the controller further comprises an evaluation circuit to perform an address conflict check based on the first address; and
   the control signal is further to be based on a second indication of the address conflict check.

4. The electronic apparatus of claim 3, wherein the evaluation circuit is further to dynamically configure a number of bits to be utilized to perform the address conflict check.

5. The electronic apparatus of claim 3, wherein:
the evaluation circuit is to:
perform a partial lookup of entries in the queue based on a configurable subset of bits of the second address; and
determine an address conflict condition as a partial conflict hit condition or a partial conflict miss condition based on the partial lookup; and
the selector circuit is to select the first path where the control signal indicates both that the partial conflict miss condition is determined based on the partial lookup, and that the bandwidth of the transactions is less than a dynamically configurable bandwidth threshold.

6. The electronic apparatus of claim 5, wherein the evaluation circuit is further to:
generate a hash of the second address for the configurable subset of the bits of the second address.

7. The electronic apparatus of claim 5, wherein the evaluation circuit is further to:
perform a full lookup of the entries in the queue based on the second address;
determine a late cancel condition based on the full lookup; and
provide a third indication of the late cancel condition to the scheduler.

8. An electronic system, comprising:
memory; and
a controller communicatively coupled to the memory, the controller comprising:
a decoder circuit to receive a first address of a request to access the memory, wherein the first address is in a first address space, the decoder circuit further to convert into a second address in a second address space;
a queue coupled to receive the second address from the decoder circuit; and
a selector circuit coupled to the decoder circuit via a first path, wherein the first path bypasses the queue, the selector circuit further coupled to the queue via a second path, and further coupled to receive a control signal which is to be based on a result of an address conflict check which is performed based on the first address, wherein, based on the control signal, the selector circuit is to select between:
the first path to communicate the second address to a scheduler; and
the second path to communicate an output of the queue to the scheduler.

9. The electronic system of claim 8, wherein the controller further comprises an evaluation circuit to:
perform the address conflict check; and
dynamically configure a number of bits utilized to perform the conflict check.

10. The electronic system of claim 9, wherein:
the evaluation circuit is to:
perform a partial lookup of entries in the queue based on a configurable subset of the bits of the second address; and
determine an address conflict condition as a partial conflict hit condition or a partial conflict miss condition based on the partial lookup; and the selector circuit is to select the to first path where the control signal indicates that the partial conflict miss condition is determined based on the partial lookup.

11. The electronic system of claim 10, wherein the evaluation circuit is further to:
generate a hash of the second address for the configurable subset of the bits of the second address.

12. The electronic system of claim 10, wherein the evaluation circuit is further to:
perform a full lookup of the entries in the queue based on the second address;
determine a late cancel condition based on the full lookup; and
provide an indication of the late cancel condition to the scheduler.

13. The electronic system of claim 8, wherein the controller further comprises:
a monitor circuit coupled to the selector circuit, the monitor circuit to generate an indication of a bandwidth of transactions which are each to access the memory; and
the control signal is further to be based on the indication of the bandwidth of the transactions.

14. The electronic system of claim 13, wherein the monitor circuit is to:
perform an evaluation as to whether the bandwidth of the transactions is less than a dynamically configurable bandwidth threshold; and
generate the indication based on the evaluation.

15. A method, comprising:
receiving a first address of a request to access a memory, wherein the first address is in a first address space;
converting the first address into a second address in a second address space;
sending the second address to a queue;
sending the second address to a selector circuit via a first path which bypasses the queue;
receiving a control signal which is based on a first indication of a bandwidth of transactions which are each to access the memory; and
based on the control signal, selecting between:
the first path to communicate the second address to a scheduler; and
a second path to communicate an output of the queue to the scheduler.

16. The method of claim 15, further comprising:
performing an evaluation as to whether the bandwidth of the transactions is less than a dynamically configurable bandwidth threshold; and
generating the first indication based on the evaluation.

17. The method of claim 15, further comprising:
performing an address conflict check based on the first address, wherein the control signal is further based on a second indication of the address conflict check.

18. The method of claim 17, further comprising:
dynamically configuring a number of bits to be utilized to perform the address conflict check.

19. The method of claim 17, wherein:
performing the address conflict check comprises:
performing a partial lookup of entries in the queue based on a configurable subset of bits of the second address; and
determining an address conflict condition as a partial conflict hit condition or a partial conflict miss condition based on the partial lookup; and
selecting between the first path and the second path comprises selecting the first path where the control signal indicates both that the partial conflict miss condition is determined based on the partial lookup, and that the bandwidth of the transactions is less than a dynamically configurable bandwidth threshold.

20. The method of claim 19, further comprising:
generating a hash of the second address for the configurable subset of the bits of the second address.

* * * * *